(12) United States Patent
Zhou et al.

(10) Patent No.: US 12,058,794 B2
(45) Date of Patent: Aug. 6, 2024

(54) MEASUREMENT METHOD AND DEVICE OF LIGHT SOURCE PARAMETERS, ILLUMINATION SYSTEM AND TERMINAL APPARATUS

(71) Applicants: OPPLE LIGHTING CO., LTD., Shanghai (CN); SUZHOU OPPLE LIGHTING CO., LTD., Suzhhou (CN)

(72) Inventors: Zhixian Zhou, Shanghai (CN); Wei Wang, Shanghai (CN); Yalong Liu, Shanghai (CN); Jun Wu, Shanghai (CN)

(73) Assignees: OPPLE LIGHTING CO., LTD., Shanghai (CN); SUZHOU OPPLE LIGHTING CO., LTD., Suzhou (CN)

( * ) Notice: Subject to any disclaimer, the term of this patent is extended or adjusted under 35 U.S.C. 154(b) by 454 days.

(21) Appl. No.: 17/378,858

(22) Filed: Jul. 19, 2021

(65) Prior Publication Data
US 2021/0345469 A1 Nov. 4, 2021

Related U.S. Application Data

(63) Continuation of application No. PCT/CN2019/130412, filed on Dec. 31, 2019.

(30) Foreign Application Priority Data

Jan. 18, 2019 (CN) .......................... 201910047279.1
Jan. 18, 2019 (CN) .......................... 201920083562.5

(51) Int. Cl.
*H05B 47/11* (2020.01)
*G01J 1/44* (2006.01)
(Continued)

(52) U.S. Cl.
CPC ................ *H05B 47/11* (2020.01); *G01J 1/44* (2013.01); *G01J 3/462* (2013.01); *G01J 3/505* (2013.01)

(58) Field of Classification Search
None
See application file for complete search history.

(56) References Cited

U.S. PATENT DOCUMENTS 5,155,558 A * 10/1992 Tannenbaum ......... G01N 21/47
356/124.5
5,375,193 A * 12/1994 Adams, Jr. ................ G01J 3/46
345/603
(Continued)

FOREIGN PATENT DOCUMENTS

CN 106596054 A 4/2017
CN 106872146 A 6/2017
(Continued)

OTHER PUBLICATIONS

International Search Report of PCT Application No. PCT/CN2019/130412 dated Apr. 3, 2020 with English translation, (4p).

*Primary Examiner* — Srinivas Sathiraju
(74) *Attorney, Agent, or Firm* — Arch & Lake LLP

(57) ABSTRACT

The examples of the disclosure disclose measurement method and device of light source parameters, an illumination system and a terminal apparatus. The method includes: collecting signal values of a light source to be measured from a color sensor, the color sensor including at least six response channels; preprocessing the signal values that have been collected, the preprocessing including normalization processing and standardization processing; constructing model features according to the signal values that have been preprocessed, and determining a light source type of the light source to be measured according to the model features; inputting the model features and the light source type that
(Continued)

has been determined into a color rendering index prediction model to obtain a color rendering index of the light source to be measured.

12 Claims, 2 Drawing Sheets

(51) Int. Cl.
  *G01J 3/46* (2006.01)
  *G01J 3/50* (2006.01)

(56) References Cited

U.S. PATENT DOCUMENTS

| | | | | |
|---|---|---|---|---|
| 5,428,720 | A * | 6/1995 | Adams, Jr. | G01J 3/46 |
| | | | | 358/518 |
| 6,707,929 | B2 * | 3/2004 | Marapane | A45D 44/005 |
| | | | | 382/162 |
| 7,069,186 | B2 * | 6/2006 | Jung | G01J 3/0218 |
| | | | | 356/402 |
| 7,710,433 | B2 * | 5/2010 | Holub | G01J 3/506 |
| | | | | 345/589 |
| 7,978,201 | B2 * | 7/2011 | Cho | G09G 3/2003 |
| | | | | 345/589 |
| 8,748,799 | B2 * | 6/2014 | Wober | B82Y 30/00 |
| | | | | 977/762 |
| 8,847,972 | B2 * | 9/2014 | Kane | H04N 21/4318 |
| | | | | 345/589 |
| 9,082,673 | B2 * | 7/2015 | Yu | H01L 31/02322 |
| 9,543,458 | B2 * | 1/2017 | Wober | H01L 27/14601 |
| 9,706,084 | B2 * | 7/2017 | Morovic | H04N 1/6033 |
| 11,205,398 | B2 * | 12/2021 | Fertik | G06F 3/04847 |
| 11,530,986 | B2 * | 12/2022 | Ghosh | G01N 21/55 |
| 11,598,632 | B2 * | 3/2023 | Pesach | A61B 5/1076 |
| 2002/0010556 | A1 * | 1/2002 | Marapane | G01J 3/526 |
| | | | | 702/32 |
| 2006/0221093 | A1 * | 10/2006 | Holub | G09G 5/006 |
| | | | | 345/589 |
| 2007/0070091 | A1 * | 3/2007 | Cho | H04N 5/58 |
| | | | | 345/589 |
| 2011/0175925 | A1 * | 7/2011 | Kane | G01J 1/4204 |
| | | | | 345/589 |
| 2012/0033535 | A1 * | 2/2012 | Shiozawa | G11B 7/24038 |
| | | | | 369/283 |
| 2015/0241274 | A1 * | 8/2015 | Barnard | H05B 45/22 |
| | | | | 250/208.2 |
| 2015/0355028 | A1 * | 12/2015 | Morrow | G01J 3/28 |
| | | | | 356/402 |
| 2016/0034795 | A1 * | 2/2016 | Morovic | G06K 15/1878 |
| | | | | 358/1.9 |
| 2017/0010151 | A1 * | 1/2017 | Xu | G01J 3/027 |
| 2017/0085768 | A1 * | 3/2017 | Van Der Sijde | H05B 45/20 |
| 2017/0205977 | A1 * | 7/2017 | Fertik | G06F 3/0483 |
| 2018/0005590 | A1 * | 1/2018 | Komanduri | F21V 7/0091 |
| 2019/0035358 | A1 * | 1/2019 | Fertik | G06F 3/04847 |
| 2020/0265796 | A1 * | 8/2020 | Fertik | G06F 3/04842 |
| 2021/0239532 | A1 * | 8/2021 | Kawasaki | G01J 3/502 |
| 2021/0345469 | A1 * | 11/2021 | Zhou | H05B 47/105 |
| 2022/0001200 | A1 * | 1/2022 | Petluri | H05B 45/22 |
| 2022/0003671 | A1 * | 1/2022 | Ghosh | G01N 21/293 |
| 2023/0285771 | A1 * | 9/2023 | Petluri | A61N 5/0618 |

FOREIGN PATENT DOCUMENTS

| | | | | |
|---|---|---|---|---|
| CN | 108738215 A | | 11/2018 | |
| CN | 109618479 A | | 4/2019 | |
| CN | 109618479 B | * | 9/2023 | G01J 1/44 |
| WO | WO-2012021468 A1 | * | 2/2012 | G01J 3/28 |
| WO | 2012021468 A1 | | 2/2016 | |
| WO | WO-2020147580 A1 | * | 7/2020 | G01J 1/44 |
| WO | WO-2021058191 A1 | * | 4/2021 | G01J 1/44 |

* cited by examiner

मेASUREMENT METHOD AND DEVICE OF LIGHT SOURCE PARAMETERS, ILLUMINATION SYSTEM AND TERMINAL APPARATUS

CROSS REFERENCE TO RELATED APPLICATIONS

This application is based upon and claims the priority of PCT patent application No. PCT/CN2019/130412 filed on Dec. 31, 2019 which claims priority of Chinese Patent Application No. 201910047279.1 filed on Jan. 18, 2019, and Chinese Patent Application No. 201920083562.5 filed on Jan. 18, 2019, the entire disclosures of these applications are incorporated herein by reference in their entirety for all purposes.

TECHNICAL FIELD

Examples of the disclosure relate to the field of measurement of light source parameters, in particular to measurement method and device of light source parameters, and an illumination system.

BACKGROUND

In the fields of intelligent illumination and smart illumination, in order to realize intelligent illumination, it is usually necessary to measure the light source parameters of an illumination apparatus, such as color parameter, color rendering index and the like.

SUMMARY

The present disclosure provides a measurement method, a device of light source parameters, and an illumination system.

Examples of the disclosure provide a measurement method of light source parameters. The method may include: collecting signal values of a light source to be measured from a color sensor, the color sensor including at least six response channels; preprocessing the signal values that have been collected, the preprocessing including normalization processing and standardization processing; constructing model features according to the signal values that have been preprocessed, and determining a light source type of the light source to be measured according to the model features; inputting the model features and the light source type that has been determined into a color rendering index prediction model to obtain a color rendering index of the light source to be measured.

The examples of the disclosure provide a measurement device of light source parameters. The device may include a color sensor, a signal preprocessing circuit, a feature constructing circuit, a light source type classification circuit and a color rendering index prediction circuit. The color sensor is configured for outputting signal values of a light source to be measured, and the color sensor comprises at least six response channels; the signal preprocessing circuit is configured for preprocessing the signal values output from the color sensor, and the preprocessing comprises normalization processing and standardization processing; the feature constructing circuit is configured for constructing model features according to the signal values that have been preprocessed; the light source type classification circuit is configured for determining a light source type of the light source to be measured according to the model features; and the color rendering index prediction circuit is configured for inputting the model features and the light source type that has been determined into a color rendering index prediction model to obtain a color rendering index of the light source to be measured.

The examples of the disclosure provide an illumination system. The illumination system comprises the measurement device of light source parameters as described above, and further comprises an illumination system communication circuit, a control terminal, and an illumination device. The control terminal is configured for obtaining the light source parameters of the illumination device obtained by the measurement device of light source parameters through the illumination system communication circuit, and controlling the illumination device according to the light source parameters and/or displaying the light source parameters.

It is to be understood that both the foregoing general description and the following detailed description are exemplary and explanatory only and are not restrictive of the present disclosure.

BRIEF DESCRIPTION OF THE DRAWINGS

The accompanying drawings which are illustrated herein are intended to provide a further understanding of the disclosure and form a part of the disclosure, and the illustrated examples and the description thereof are intended to explain the disclosure and are not unduly limitations of the disclosure. In the drawings.

DETAILED DESCRIPTION

The technical solutions of the disclosure will be described in a way in connection with the examples of the disclosure and the drawings thereof. The described examples are just a part but not all of the examples of the disclosure. Based on the described examples herein, those skilled in the art can obtain other example(s), without any inventive work, which should be within the scope of the disclosure.

Sometimes, the measurement is carried out by using a spectrometer and the like. Although the spectrometer can accurately measure the light source parameters of the light source, the spectrometer has the problem of inconvenience in measurement because of its complex measurement principle; moreover, the spectrometer is large in size and is expensive, which is not suitable for large-scale application in intelligent illumination. Therefore, it is necessary to provide a simple technical solution for measuring the light source parameters.

Figure 1:
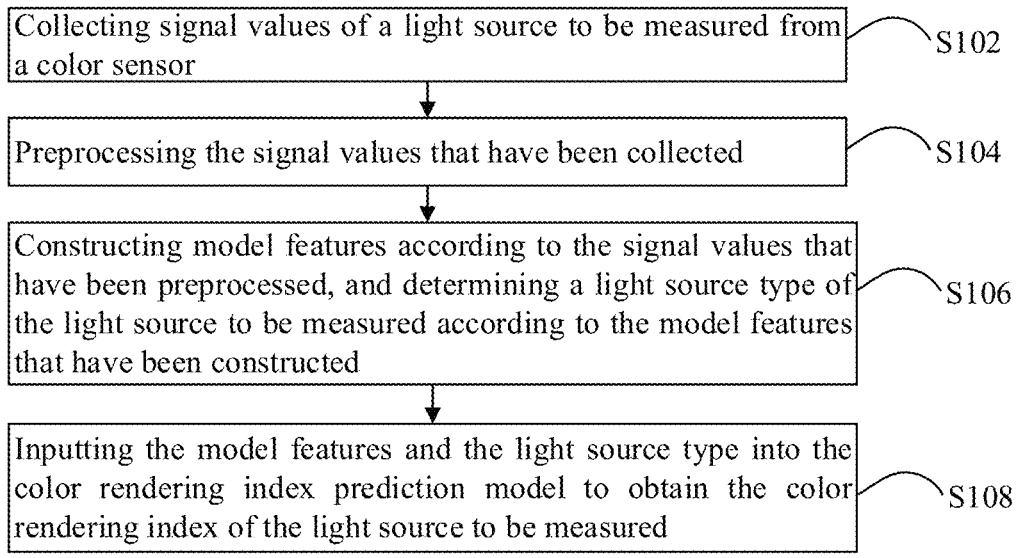
FIG. 1 shows a schematic flow diagram of a measurement method of light source parameters provided by examples of the disclosure.

As shown in FIG. 1, the examples of the disclosure provide a measurement method of light source parameters, and the method comprises the following steps:

S102: collecting signal values of a light source to be measured from a color sensor.

For example, the color sensor comprises at least six response channels, the wavelengths respectively corresponding to the plurality of response channels (i.e., the at least six response channels as mentioned above) are uniformly distributed in the wavelength range of visible light (380-780 nm). The uniform distribution mentioned herein for example is a uniformity of non-strict sense; for example, in a specific example, the color sensor comprises six response channels, the wavelengths respectively corresponding to the six response channels are 450 nm, 500 nm, 550 nm, 570 nm, 600 nm, 650 nm, respectively.

In at least one example, the color sensor comprises at least one response channel in a first wavelength range, at least one response channel in a second wavelength range and at least one response channel in a third wavelength range, respectively; for example, the first wavelength range is 435-455 nm, the second wavelength range is 545-565 nm, and the third wavelength range is 590-610 nm, all of which have the unit of nm. In this way, the light source parameters of the light source to be measured can be accurately measured.

In an example, the color sensor comprises at least one response channel at or near the wavelength position of 445 nm, 555 nm and 600 nm (in the case that the at least one response channel is near the wavelength position of 445 nm, 555 nm and 600 nm, the deviation of the position from the peak wavelength position ≤10 nm, further, the deviation of the position from the peak wavelength position ≤5 nm), respectively, that is, the color sensor comprises at least one response channel at or near the wavelength position of 445 nm; the color sensor comprises at least one response channel at or near the wavelength position of 555 nm; the color sensor comprises at least one response channel at or near the wavelength position of 600 nm.

In at least one example, the above at least six response channels are narrow-band response channels, each of which has a half width less than or equal to a preset value. In an example, the response spectrum corresponding to each response channel of the color sensor has the half width ≤50.0 nm, that is, the color sensor with narrow-band response channel is employed by the disclosure, and thus the light source parameters of the light source to be measured can be measured accurately.

It is should be understood that within a certain range, the more the total number of the response channels included in the color sensor is, the higher the accuracy of the finally obtained light source parameters is.

However, considering that the calculation complexity of light source parameters increases accordingly with the increasing of the total number of the response channels of the color sensor, in an example, the total number of the response channels of the color sensor is 6-18, the wavelengths respectively corresponding to the 6-18 response channels are uniformly distributed in the wavelength range of visible light.

By appropriately setting the total number of the response channels of the color sensor as described above, not only the accuracy of the finally obtained light source parameters can be improved, but also the calculation complexity of the light source parameters can be controlled in a reasonable range as well, which saves the resources required in the calculation process.

S104: preprocessing the signal values that have been collected.

For example, the preprocessing process includes normalization processing and standardization processing, etc.

In an example, the signal values from the color sensor are $\{T_1, T_2, T_3, \ldots, T_i\}$ wherein, i represents the maximum serial number of the response channels of the color sensor.

In the step of S104, the signal values that have been collected are normalized; in this case, for example, normalization processing of N-norm is employed, that is, firstly, a scaling factor F is obtained by the following formula, $$F^N = T_1^N + T_2^N + T_3^N + \ldots + T_i^N$$

then, each of the signal values that have been collected $\{T_1, T_2, T_3, \ldots, T_i\}$ is scaled according to the following formula, thus the signal values related to luminous flux are transformed to signal values unrelated to luminous flux.

$$T'_i = T_i / F$$

Finally, i signal values $T'_i$ that have been normalized are subject to standardization processing by using the following formula:

$$T''_i = (T'_i - \mu) / \sigma$$

In the formula, $\mu$ is an average value, $\sigma$ is a standard deviation. For example, $\mu$ and $\sigma$ are obtained in advance from a large number of related sample sets.

In an example, the signal values of a plurality of reference light sources are obtained in advance by the color sensor; then, the signal values of each reference light source is normalized by using the above normalization processing; thus, the average value $\mu$ and the standard deviation $\sigma$ are obtained by calculating based on the normalized signal values of the plurality of reference light sources.

In the examples of the disclosure, the signal values that have been collected are subjected to normalization processing, standardization processing and the like, and thus it is convenient to construct model features and determine the light source type of the light source to be measured and so on in subsequent steps.

S106: constructing model features according to the signal values that have been preprocessed, and determining the light source type of the light source to be measured according to the model features that have been constructed.

For example, the model features that have been constructed are matched with a preset color rendering index prediction model.

In at least one example, before carrying out the technical solution of the disclosure, a model training is performed according to the signal values of the plurality of reference light sources obtained by the color sensor and the color rendering indexes of the plurality of reference light sources, to generate the color rendering index prediction model, and the color rendering index prediction model is used for predicting the color rendering index of the light source to be measured.

For example, during the model training, the color rendering indexes of the plurality of reference light sources are obtained by a spectrometer; although measuring the color rendering index by the spectrometer is complicated, the accuracy of the color rendering index measured by the spectrometer is guaranteed. During constructing the color rendering index prediction model, the color rendering index is accurately obtained by the spectrometer, which further improves the prediction accuracy of the model training. In at least one example, the above color rendering index prediction model for example is a neural network model, a regression tree model, a generalized linear regression model and the like, or a combination and stack thereof.

In this way, according to the model features required by the color rendering index prediction model, the signal values that have been preprocessed by step S104 are subjected to feature construction so as to construct the model features matched with the color rendering index prediction model. The model features that have been constructed for example include a linear feature, a nonlinear feature and a combined feature of the linear feature and the nonlinear feature, and the model features that have been constructed are consistent with the model features required by the preset color rendering index prediction model, i.e., the model features constructed in this step are matched with the preset color rendering index prediction model as described above.

In an example, the plurality of signal values that have been preprocessed by step S104 are subjected to feature construction by employing the feature construction formula as follows:

$$\{P\}=h\{f(T''_i)+g(T''_i)\}$$

By using the above formula, i signal values are transformed to the feature set {P} with the number of L (L>=i). In the above formula, f(x), g(x) and h(x) represent a linear feature construction function, a nonlinear feature construction function and a combined feature construction function, respectively.

In at least one example, before the step of S108, the light source type Y of the light source to be measured is determined according to the model features that have been constructed. For example, the light source type Y includes, but is not limited to a light emitting diode (LED), a compact fluorescent or daylight lamp (CFL), a high-pressure gas discharge lamp (HID), natural light, etc.

In at least one example, the light source type Y of the light source to be measured is determined by employing a light source type classification model, and the light source type classification model for example is a neural network model, a support vector machine model (SVM), a decision tree model, a random forest model and the like, or a combination and stack thereof. The constructing process of the light source type classification model is similar to that of the color rendering index prediction model described above, and detailed description thereof will be omitted for simplicity.

In at least one example, the color rendering index prediction model is provided with different weight coefficients for different types of light sources, thereby improving the prediction accuracy of the color rendering index prediction model.

S108: inputting the model features and the light source type of the light source to be measured into the color rendering index prediction model to obtain the color rendering index of the light source to be measured.

According to the method of measuring the light source parameters provided by the examples of the disclosure, the signal values of the light source to be measured are collected from the color sensor, the model features are constructed after the signal values that have been collected are preprocessed, the light source type of the light source to be measured is determined according to the model features that have been constructed, and the model features that have been constructed and the light source type that has been determined are input into the color rendering index prediction model so as to obtain the color rendering index of the light source to be measured. Because only the color sensor and the constructed color rendering index prediction model are required, measurement of the color rendering index is simple according to the examples of the disclosure, as compared with the method for measuring the color rendering index by the spectrometer in the prior art.

Based on the method illustrated in FIG. 1, in at least one example, after collecting the signal values of the light source to be measured from the color sensor in step S102, the method for example further includes the following steps: obtaining tristimulus values of the light source to be measured based on the signal values that have been collected and a preset conversion coefficient; and obtaining at least one of color coordinate, color temperature and illuminance of the light source to be measured based on the tristimulus values that have been obtained.

Specifically, if the signal values that have been collected are $\{T_1, T_2, T_3, \ldots, T_i\}$, wherein, i represents the maximum serial number of the response channels, then the tristimulus values of the light source to be measured is obtained based on the following formula:

$$\begin{pmatrix} X \\ Y \\ Z \end{pmatrix} = [K_{sensor}] \times (T_1 \quad T_2 \quad \ldots \quad T_i)$$

In this formula, X, Y and Z represent the tristimulus values of the light source to be measured; $[K_{sensor}]$ is the conversion coefficient, such as a matrix coefficient.

Specifically, after obtaining the tristimulus values of the light source to be measured, the color coordinate of the light source to be measured is obtained by employing the following formulas respectively:

$$x=X/X+Y+Z$$

$$y=Y/X+Y+Z$$

In the two formulas, x and y represent the abscissa value and ordinate value of the color coordinate (x, y), respectively; X, Y and Z represent the tristimulus values of the light source to be measured, respectively.

After obtaining the color coordinate of the light source to be measured, the color temperature (CCT) of the light source to be measured is obtained by the following formula:

$$CCT=437n^3+3601n^2+6831n+5517$$

In this formula, the variable n is calculated based on the abscissa value and ordinate value of the color coordinate of the light source to be measured:

$$n=x-0.3320/0.1858-y$$

Specifically, after obtaining the tristimulus values of the light source to be measured, the illuminance of the light source to be measured is obtained by employing the following formula:

$$illuminance=K_{illuminance} \times Y$$

In this formula, $K_{illuminance}$ is a constant, Y is the stimulus value of green primary color in the tristimulus values of the light source to be measured. $K_{illuminance}$ is obtained by performing a test comparison between a standard spectral illuminometer and a measurement device of light source parameters provided by the examples of the disclosure (described in the subsequent examples) at a same position of the reference light source.

$$K_{illuminance} = \frac{illuminance_{std}}{Y_{std}}$$

In this formula, $illuminance_{std}$ is the illuminance value of the reference light source obtained by the standard spectral illuminometer, $Y_{std}$ is the illuminance value of the reference light source obtained by the measurement device of light source parameters provided by the examples of the disclosure.

In the above example, the conversion coefficient $[K_{sensor}]$ is needed during calculating the tristimulus values of the light source to be measured. In at least one example, before the above step of calculating the tristimulus values of the light source to be measured, the method further comprises the following step:

calculating the conversion coefficient [K$_{sensor}$] according to the signal values of the plurality of reference light sources obtained by the color sensor and the tristimulus values of the plurality of reference light sources obtained by the spectrometer.

During calculating the conversion coefficient [K$_{sensor}$], for example, the following steps are employed:

a) pre-selecting the plurality of reference light sources (or known as reference lamps) of different spectra, which include, but are not limited to LED lamps of different color temperatures, fluorescent lamps of different color temperatures, incandescent lamps of different color temperatures and ceramic metal halide lamps of different color temperatures, etc.

Preferably, the total number of the reference lamps ≥n* the total number of the response channels of the color sensor, n≥1, and n is not limited to integers; the luminous fluxes of the reference lamps for example are in the range of 100-4000 lm, or, the illuminance of the reference lamps for example is in the range of 100-4000 lx.

Preferably, at least one reference lamp is provided in different luminous flux ranges or in different illumination ranges. In other words, the luminous fluxes of the plurality of reference lamps are uniformly distributed within the luminous flux range above, or the illuminance ranges of the plurality of reference lamps are uniformly distributed within the illuminance range above.

b) placing one of the plurality of reference lamps (one reference lamp is placed at one time, and the plurality of reference lamps are sequentially measured) and the device containing the color sensor into an integrating sphere at the same time. For example, the reference lamp is placed at a center of the integrating sphere, the measurement device of light source parameters provided by the examples of the disclosure (described in the subsequent examples) is placed on an inner tangent plane of the integrating sphere, and a light-receiving direction of the measurement device of light source parameters faces the center of the integrating sphere. The integrating sphere is a sphere with cavity, and an inner wall of the cavity is coated with white diffuse reflection material; the integrating sphere is also known as a photometric sphere, a light-flux sphere, etc. The light in the integrating sphere is reflected many times by the white diffuse reflection material coated on the inner wall, thus forming uniform illuminance on the inner wall.

c) after lighting the reference lamp and maintaining it stable, obtaining the tristimulus values {X$_n$, Y$_n$, Z$_n$} of the reference lamp by using the spectrometer, while obtaining the signal values {T$_{n1}$, T$_{n2}$, T$_{n3}$, ..., T$_{ni}$} by using the color sensor (contained in the measurement device of light source parameters) mentioned in the above examples of the disclosure. Wherein, the serial number n represents the nth reference lamp, i represents the serial number of the response channels of the color sensor.

d) calculating the conversion coefficient [K$_{sensor}$] by the following formula:

$$[K_{sensor}] = (M'M)^{-1}(M'N)$$

Wherein, M and N are shown in the following formulas respectively:

$$M = \begin{pmatrix} T_{11} & T_{12} & T_{13} & ... & T_{1i} \\ T_{21} & T_{22} & T_{23} & ... & T_{2i} \\ T_{n1} & T_{n2} & T_{n3} & ... & T_{ni} \end{pmatrix}$$

$$N = \begin{pmatrix} X_1 & Y_1 & Z_1 \\ X_2 & Y_2 & Z_2 \\ ... & ... & ... \\ X_n & Y_n & Z_n \end{pmatrix}$$

In the above examples, the conversion coefficient [K$_{sensor}$] is obtained by calculating, and the conversion coefficient [K$_{sensor}$] is used for calculating the color coordinate, color temperature, illuminance and the like of the light source to be measured. Because a large number of reference lamps together with the spectrometer with high measurement accuracy are used in calculating the conversion coefficient, the accuracy of the obtained conversion coefficient [K$_{sensor}$] is improved, thereby improving the accuracy of the color coordinate, color temperature, illuminance and the like of the light source to be measured obtained based on the conversion coefficient [K$_{sensor}$].

Figure 2:
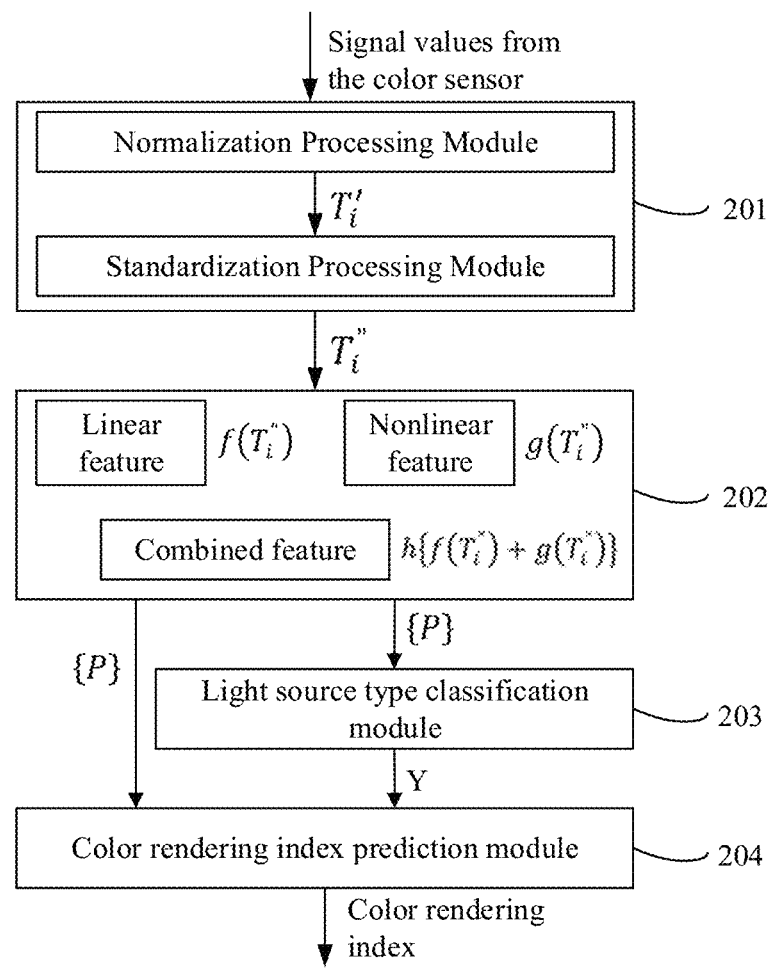
FIG. 2 shows a schematic view of partial structures of a measurement device of light source parameters provided by the examples of the disclosure.
Figure 3:
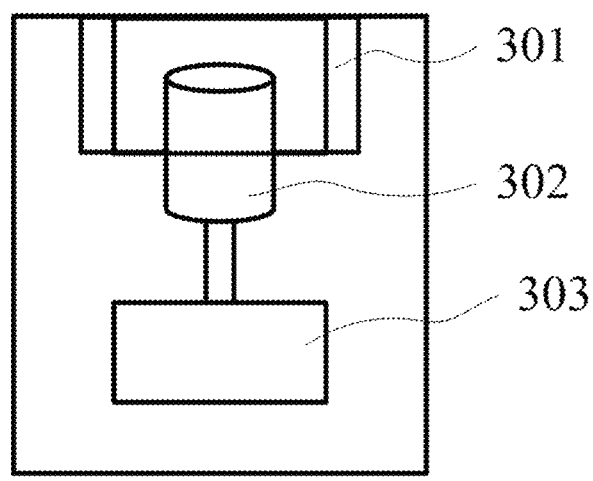
FIG. 3 shows a schematic view of a structure of the measurement device of light source parameters provided by the examples of the disclosure.

Corresponding to the measurement method of light source parameters mentioned in the above examples, as shown in FIG. 2 and FIG. 3, the examples of the disclosure further provide a measurement device of light source parameters, which comprises a color sensor 302 and a micro-controller unit MCU 303. As shown in FIG. 2, the MCU 303 includes a signal preprocessing module 201, a feature construction module 202, a light source type classification module 203 and a color rendering index prediction module 204. For example, the color sensor 302 is configured for outputting the signal values of the light source to be measured, and the color sensor comprises at least six response channels; the signal preprocessing module 201 is configured for preprocessing the signal values output from the color sensor 302, and the preprocessing comprises normalization processing and standardization processing; the feature construction module 202 is configured for constructing the model features according to the signal values that have been preprocessed; the light source type classification module 203 is configured for determining the light source type of the light source to be measured according to the model features; the color rendering index prediction module 204 is configured for inputting the model features that have been constructed and the light source type that has been determined into the color rendering index prediction model to obtain the color rendering index of the light source to be measured.

In at least one example, in other examples, the signal preprocessing module 201, the feature construction module 202, the light source type classification module 203 and the color rendering index prediction module 204 described above are integrated in a terminal apparatus, such as a mobile phone, rather than the MCU as described above.

According to the device for measuring the light source parameters provided by the examples of the disclosure, the signal values of the light source to be measured are collected from the color sensor, the model features are constructed after the signal values that have been collected are preprocessed, the light source type of the light source to be measured is determined according to the model features that have been constructed, and the model features that have been constructed and the light source type that has been determined are input into the color rendering index prediction model so as to obtain the color rendering index of the light source to be measured. Because only the color sensor and the constructed color rendering index prediction model are required, measurement of the color rendering index is simple according to the examples of the disclosure, as compared with the method for measuring the color rendering index by the spectrometer in the prior art.

In at least one example, as an example, the MCU 303 further comprises a color parameter measurement module (not shown), which is configured for obtaining the tristimulus values of the light source to be measured according to the signals value that have been collected and the preset conversion coefficient, and obtaining at least one of the color coordinate, color temperature and illuminance of the light source to be measured based on the tristimulus values.

In at least one example, as an example, the color parameter measurement module is further configured for calculating the conversion coefficient based on the signal values of a plurality of first reference light sources obtained by the color sensor and the tristimulus values of the plurality of first reference light sources obtained by the spectrometer.

In at least one example, as an example, the MCU 303 further comprises a model training module (not shown), which is configured for performing model training based on the signal values of a plurality of second reference light sources obtained by the color sensor and the color rendering indexes of the plurality of second reference light sources, thereby generating the color rendering index prediction model 204.

In at least one example, as an example, the total number of the at least six response channels is 6~18; the wavelengths respectively corresponding to the at least six response channels are uniformly distributed in the wavelength range of visible light.

In at least one example, as an example, the color sensor 302 is a narrow-band color sensor.

In at least one example, as an example, the color sensor comprises at least one response channel in a first wavelength range, at least one response channel in a second wavelength range and at least one response channel in a third wavelength range, respectively; wherein, the first wavelength range is 435-455 nm, the second wavelength range is 545-565 nm, and the third wavelength range is 590-610 nm.

In at least one example, as an example, as shown in FIG. 3, the measurement device further comprises at least one of a lens 301, a communication module and a housing (see the outermost border in FIG. 3, not numbered). For example, the lens is configured for performing a homogenizing processing on the light source to be measured; and the communication module is configured for receiving a control instruction for executing the measurement of light source parameters; and the color sensor, the signal preprocessing module, the feature construction module, the light source type classification module and the color rendering index prediction module are all accommodated in the housing.

In at least one example, as an example, the measurement device further comprises a deviation calculator module (not shown) configured for determining deviation values of the light source parameters obtained by the device.

In at least one example, as an example, the measurement device further comprises an illuminance coefficient determining module (not shown) configured for calculating the illuminance coefficient of the measurement device based on the illuminance value of a third reference light source obtained by the standard spectral illuminometer and the illuminance value of the third reference light source obtained by the measurement device, and the illuminance coefficient is used for determining the illuminance of the light source to be measured.

The measurement device of light source parameters according to the examples of the disclosure may refer to the flow of the measurement method of light source parameters according to the examples of the disclosure; and for the sake of simplicity, each unit/module in the measurement device of light source parameters and other operations and/or functions mentioned above to respectively achieve the above corresponding steps of the measurement method of light source parameters, will not be described in detail herein.

In at least one example, the measurement device of light source parameters provided by the above various examples for example further comprises a communication module, for example, a Bluetooth module or a WiFi module. In this way, the measurement device of light source parameters provided by the above various examples may be used as a measurement device alone to measure the light source parameters of the light source to be measured; or the measurement device of light source parameters provided by the above various examples may be controlled by APP of a mobile phone/iPad to measure the light source parameters of the light source to be measured; or the measurement device of light source parameters provided by the above various examples may be integrated into an illumination system as a component.

The examples of the disclosure also provide an illumination system (not shown), which comprises an illumination device and the measurement device of light source parameters described in the above examples; and the illumination system for example further comprises an illumination system communication module, a control terminal, etc. The illumination device for example is a decorative lamp, a ceiling lamp, a bulb lamp, a candle bubble lamp, a G bulb lamp, a downlight lamp and the like. In the illumination system, the communication module for example is a wired communication module or a wireless module such as Bluetooth communication module, Zigbee and the like. The control terminal for example is configured for obtaining the light source parameters of the illumination device obtained by the measurement device of light source parameters through the illumination system communication module, and then controlling the illumination of the illumination device, such as switching on, switching off and adjusting brightness, based on the light source parameters, thus enabling intelligent illumination. In at least one example, the control terminal for example is a mobile phone and the like, and for example is configured to display the light source parameters in real time. The illumination system provided by the examples of the disclosure can achieve the same or similar technical effects as the above-mentioned examples and will not be described in detail herein.

The examples of the disclosure also provide a terminal apparatus (not shown) comprising the measurement device of light source parameters described in the above various examples. The terminal apparatus for example is a mobile phone, PC and the like, and for example is designed separately from or integrated with the color sensor in the measurement device of light source parameters described above. The terminal apparatus provided by the examples of the disclosure can achieve the same or similar technical effects as the above various examples and will not be described in detail herein.

The above-mentioned examples describe the measurement method of light source parameters and the measurement device of light source parameters according to the examples of the disclosure, which are described below in combination with an example.

In the example, in the measurement device of light source parameters provided by the examples of the disclosure, the color sensor is provided with six response channels, the peak positions of the six response channels are at 450 nm, 500 nm, 550 nm, 570 nm, 600 nm, 650 nm, respectively; the half widths of the six response channels are 40.8 nm, 41.0 nm, 42.2 nm, 43.8 nm, 30.0 nm, 42.0 nm, respectively, and none of them exceeds 50 nm.

According to the method for measuring the conversion coefficient $[K_{sensor}]$ described in the previous examples, the conversion coefficient $[K_{sensor}]$ is obtained as follows by the spectrometer and a large number of reference light sources:

$$[K_{sensor}] = \begin{pmatrix} -1.07 & 0.82 & 0.42 & 0.66 & 0.30 & -0.19 \\ -1.33 & 1.07 & 0.70 & 0.85 & -0.025 & -0.28 \\ -0.10 & 1.86 & 0.28 & 0.55 & -0.27 & -0.60 \end{pmatrix}$$

By employing the standard spectral illuminometer and the measurement device of light source parameters provided by the examples of the disclosure, the illuminance constant $K_{illuminance}$ of the measurement device of light source parameters provided by the examples of the disclosure is obtained as:

$$K_{illuminance} = 0.965$$

The light source parameters of an LED lamp of 4000K is measured, the signal values of the color sensor of the measurement device of light source parameters are transformed as {34, 43, 85, 107, 118, 82}; and by employing the related formulas mentioned above and the like, the light source parameters are respectively calculated and obtained as follows:

Color coordinate x, y (0.3811, 0.3808); color temperature 4012K; illuminance 120.8 lx; color rendering index CRI 84.1.

At the same time, the above LED lamp is measured by the standard spectral illuminometer, the spectrometer and the like, to obtain the light source parameters of the light source as follows:

Color coordinate x, y (0.3843, 0.3834); color temperature 3946K; illuminance 117.6 lx; color rendering index 83.6.

Based on the following deviation calculation formula:

Color deviation $duv$=sqrt(($u$_sensor-$u$_illuminometer)^2+($v$_sensor-$v$_illuminometer)^2), wherein, the value of the color coordinate for example is converted from the $xy$ coordinate system to the $uv$ coordinate system during calculating the color deviation;

Illuminance deviation=abs((illuminance_sensor−illuminance_illuminometer)/illuminance_illuminometer) %;

Color rendering index deviation=abs(CRI_sensor-CRI_illuminometer);

The respective deviation values of the measurement device of light source parameters provided by the examples of the disclosure are obtained as follows:

Color deviation duv=0.0015; illuminance deviation=2.7%; color rendering index deviation=0.5.

Based on the deviation calculation for a large number of light sources, the measurement accuracies of the measurement device of light source parameters provided by the examples of the disclosure are obtained as follows: the measurement accuracy of color coordinate ≤0.005; the measurement accuracy of illuminance ≤5%; the measurement accuracy of color rendering index |dCRI|≤2.0, all of which achieve high measurement accuracy.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above description is only some examples of the disclosure and is not intended to limit the disclosure. Various modifications and variations of the disclosure can be made as will be apparent to those skilled in the art. Any modifications, equivalents, modifications and the like made without departing from the spirit and principles of the disclosure should be included within the scope of the disclosure.

The invention claimed is:

1. A measurement device of light source parameters, comprising a color sensor, a signal preprocessing circuit, a feature constructing circuit, a light source type classification circuit and a color rendering index prediction circuit, wherein:
   the color sensor is configured for outputting signal values of a light source to be measured, and the color sensor comprises at least six response channels;
   the signal preprocessing circuit is configured for preprocessing the signal values output from the color sensor, and the preprocessing comprises normalization processing and standardization processing;
   the feature constructing circuit is configured for constructing model features according to the signal values that have been preprocessed;
   the light source type classification circuit is configured for determining a light source type of the light source to be measured according to the model features; and
   the color rendering index prediction circuit is configured for inputting the model features and the light source type that has been determined into a color rendering index prediction model to obtain a color rendering index of the light source to be measured.

2. The device according to claim 1, wherein the device further comprises a color parameter measurement circuit configured for:
   obtaining tristimulus values of the light source to be measured according to the signals value that have been collected and a preset conversion coefficient, and
   obtaining at least one of color coordinate, color temperature and illuminance of the light source to be measured based on the tristimulus values.

3. The device according to claim 2, wherein the color parameter measurement circuit is further configured for calculating the conversion coefficient according to the signal values of a plurality of first reference light sources from the color sensor and tristimulus values of the plurality of first reference light sources from a spectrometer.

4. The device according to claim 2, further comprising: an illuminance coefficient determining circuit configured for calculating an illuminance coefficient of the measurement device based on an illuminance value of a third reference light source obtained by a standard spectral illuminometer and an illuminance value of the third reference light source obtained by the measurement device, and the illuminance coefficient is used for determining the illuminance of the light source to be measured.

5. The device according to claim 1, wherein the device further comprises a model training circuit configured for:
performing model training according to the signal values of a plurality of second reference light sources from the color sensor and color rendering indexes of the plurality of second reference light sources, thereby generating the color rendering index prediction model.

6. The device according to claim 5, wherein:
a total number of the at least six response channels is 6-18; and
wavelengths respectively corresponding to the at least six response channels are uniformly distributed in a wavelength range of visible light.

7. The device according to claim 6, wherein:
the at least six response channels are all narrow-band response channels.

8. The device according to claim 7, wherein:
the color sensor comprises at least one response channel in a first wavelength range, at least one response channel in a second wavelength range and at least one response channel in a third wavelength range, respectively; and
the first wavelength range is 435-455 nm, the second wavelength range is 545-565 nm, and the third wavelength range is 590-610 nm.

9. The device according to claim 1, further comprising: at least one of a lens, a communication circuit and a housing, and wherein:
the lens is configured for performing a homogenizing processing on the light source to be measured;
the communication circuit is configured for receiving a control instruction for executing the measurement of light source parameters; and
the color sensor, the signal preprocessing circuit, the feature constructing circuit, the light source type classification circuit and the color rendering index prediction circuit are all accommodated in the housing.

10. The device according to claim 1, further comprising a deviation calculator circuit for determining deviation values of the light source parameters obtained by the device.

11. The device according to claim 1, wherein the device is a component of a terminal apparatus.

12. An illumination system comprising a measurement device of light source parameters, an illumination system communication circuit, a control terminal, and an illumination device, wherein:
the measurement device of light source parameters comprises a color sensor, a signal preprocessing circuit, a feature constructing circuit, a light source type classification circuit and a color rendering index prediction circuit;
the color sensor is configured for outputting signal values of a light source to be measured, and the color sensor comprises at least six response channels;
the signal preprocessing circuit is configured for preprocessing the signal values output from the color sensor, and the preprocessing comprises normalization processing and standardization processing;
the feature constructing circuit is configured for constructing model features according to the signal values that have been preprocessed;
the light source type classification circuit is configured for determining a light source type of the light source to be measured according to the model features;
the color rendering index prediction circuit is configured for inputting the model features and the light source type that has been determined into a color rendering index prediction model to obtain a color rendering index of the light source to be measured; and
the control terminal is configured for obtaining the light source parameters of the illumination device obtained by the measurement device of light source parameters through the illumination system communication circuit, and controlling the illumination device according to the light source parameters and displaying the light source parameters.

* * * * *